Figure 1:
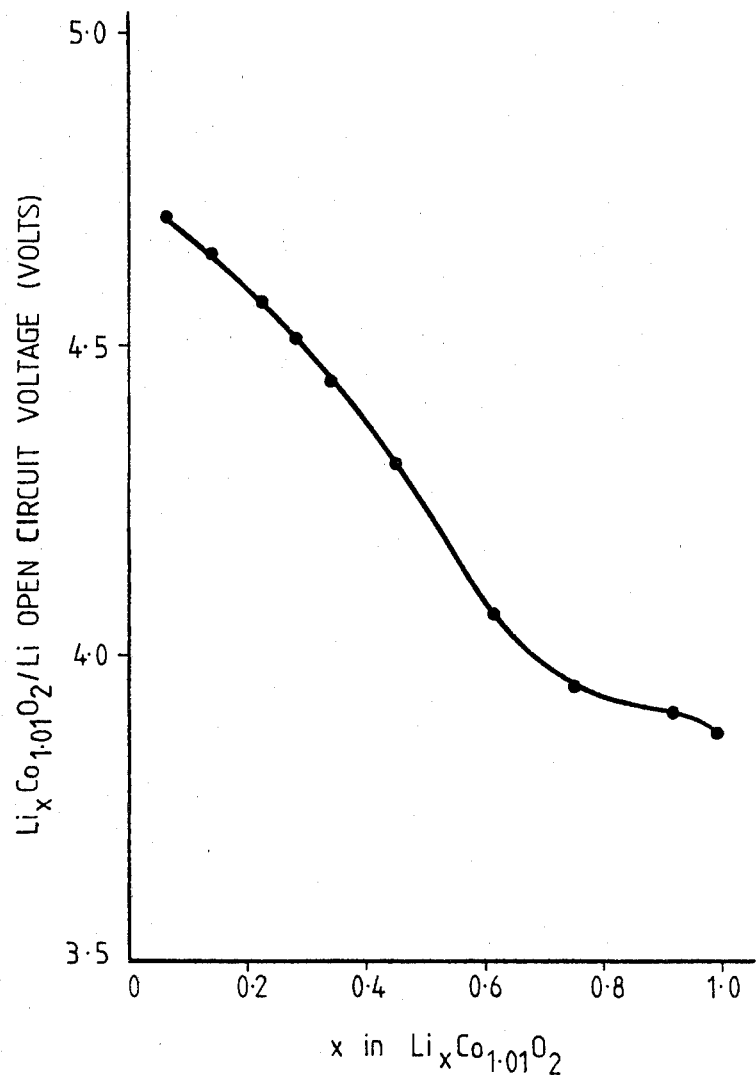

United States Patent [19]

Goodenough et al.

[11] 4,357,215

[45] Nov. 2, 1982

[54] FAST ION CONDUCTORS

[76] Inventors: John B. Goodenough; Koichi Mizushima, both of United Kingdom Atomic Energy Authority, 11 Charles II St., London SW1Y 4QP, England

[21] Appl. No.: 259,104

[22] Filed: Apr. 30, 1981

Related U.S. Application Data

[62] Division of Ser. No. 135,222, Mar. 31, 1980, Pat. No. 4,302,518.

[30] Foreign Application Priority Data

Apr. 5, 1979 [GB] United Kingdom ................. 7911953

[51] Int. Cl.³ .......................................... H01M 10/44
[52] U.S. Cl. .................................... 204/2.1; 429/193; 429/194; 423/594; 252/182.1
[58] Field of Search ............... 429/191, 193, 194, 101, 429/104, 218, 199; 423/593-596, 598, 599; 252/182.1; 204/2.1

[56] References Cited

U.S. PATENT DOCUMENTS 3,873,369   3/1975   Kamenski ........................... 429/194
3,970,473   7/1976   Roth et al. ........................... 429/191
4,198,476   4/1980   Di Salvo, Jr. et al. ............. 429/194

Primary Examiner—Charles F. LeFevour
Attorney, Agent, or Firm—Larson and Taylor

[57] ABSTRACT

There is interest in the use of solid-solution electrodes as a way of meeting the problems of conventional batteries; $Li_aTiS_2$ where $0 \leq a \leq 1$ is known in this respect and may be made by high temperature preparative routes.

Fast ion conductors of the formula $A_xM_yO_2$ where A is Li, Na or K, M is a transition metal e.g. Co or Ni, $\leq x < 1$ and $y \approx 1$ have been made for this purpose according to the invention. They cannot be made by high temperature routes when x is substantially less than 1 owing to stability problems. In the invention, they have been made by electrochemical extraction of $A^+$ ions from compounds of the formula $A_{x'}M_yO_2$ where $0 < x' \leq 1$, carried out at low temperature.

3 Claims, 3 Drawing Figures

FAST ION CONDUCTORS

This is a division of the application Ser. No. 135,222 filed Mar. 31, 1980 now U.S. Pat. No. 4,302,518.

The invention relates to ion conductors, their preparation and their use as solid-solution electrodes in electrochemical cells; the conductors comprise mixed oxides having the layer structure of $\alpha$-$NaCrO_2$.

Conventional batteries rely on mass transport from one solid electrode to another through a liquid electrolyte. Chemical reaction at the cathode results in the formation of a new solid compound, and power densities may be limited by the low mobilities of the interphase boundaries. Moreover, volume changes associated with the formation of a new phase cause degradation of the electrode. Two ways of meeting these problems have hitherto been proposed, namely, use of liquid electrodes separated by a solid electrolyte and use of a solid-solution cathode that is a mixed ionic/electronic conductor. The former requires operation at temperatures high enough to keep the electrodes molten; the latter permits low-temperature operation. The layer compounds $Li_aTiS_2$, where $0 \leq a \leq 1$, are known to be suitable for use in the latter and may be prepared by a high temperature preparative route. The compound $LiNiO_2$ is known (J. Amer. Chem. Soc., 76, 1499 (1954) and J. Phys. Chem. Solids 5 107 (1958)) and may be made by a high temperature preparative route. However, it has hitherto been impossible to make substantially $Li^+$ deficient analogues by high temperature preparative routes. The literature does, however, describe the high temperature production of $Na_{1-b}CoO_2$ but only where $0 \leq b \leq 0.1$ (C. Delmas, Theses de Docteures Sciences Physiques, Bordeaux Univ. (1976)).

According to the present invention, compounds have been devised by extraction of cations from known compounds and whose open circuit voltages with respect to an alkali metal counter electrode have been found in certain tests to be about twice as large as those found for the abovementioned $Li_aTiS_2$ in similar tests. Thus, in a first aspect, the invention provides an ion conductor, characterised by the formula $A_xM_yO_2$ and having the layers of the $\alpha$-$NaCrO_2$ structure, in which formula A is Li, Na or K; M is a transition metal; x is less than 1 and y is approximately equal to 1, the $A^+$ cation vacancies in the ion conductor having been created by $A^+$ cation vacancies.

In a second aspect, the invention provides a method of making an ion conductor, characterised in that $A^+$ cations are extracted from a compound of the formula $A_{x'}M_yO_2$ having the layers of the $\alpha$-$NaCrO_2$ structure, in which formula $x'$ is less than or equal to 1 and y, A and M are defined as above, to produce an ion conductor of the formula $A_xM_yO_2$ as defined above. Preferably, the extraction is carried out electrochemically, for example, by charging a non-aqueous cell represented as $A$/electrolyte/$A_{x'}M_yO_2$ towards a cell represented as $A$/electrolyte/$M_yO_2$, thereby producing a compound $A_xM_yO_2$ in which x is less than $x'$ in the starting material. In this way, a large proportion of $A^+$ ions may be removed before the layer structure present in the starting material is destroyed.

Open-circuit voltages of compounds of the formula $Li_xCo_yO_2$ where x and y are defined as above have been measured with respect to a Li counter electrode and found to be nearly twice as large as those found for the known ion conductor $Li_aTiS_2$ mentioned above. Also, good reversibility and low overvoltages have been found over a large range of values of x for current densities of up to 4 $mAcm^{-2}$. Compounds of the formula $A_xM_yO_2$ therefore have potential application as solid-solution electrodes in electrochemical cells.

Preferably, A is Li, though compounds where A is Na would be expected to achieve comparable results in the above tests. Compounds where A is K are of less certain utility because of the relatively larger size of the $K^+$ ion. Also, A may be constituted by a mixture of two or more of Li, Na and K e.g. Li and Na; other 'A' group metal ions of the Periodic Table such as $Ca^{++}$ may be present in very small amounts to optimise the mobility of the Li, Na or K ions by slightly altering the structure of the ion conductor.

M may be any transition-metal ion though ions of atomic number form 23 to 28 inclusive are of particular interest; Co and Ni have given particularly good results. M need not necessarily be a single transition metal ion but may be constituted by a mixture of transition metal ions.

y is stated to be approximately equal to 1 because, in practice, precise stoichiometry in this respect is rarely achieved. Thus, in the case of $Li_xNi_yO_2$, y was found to be 1.15 in a particular example and in the case of $Li_xCo_yO_2$, y was found to be 1.01 in a particular example.

The values of x that are attainable are determined by stability considerations. In practice, values of x as low as 0.067 have been attained. It is an important requirement for use of the compounds of the formula $A_xM_yO_2$ as solid-solution electrodes that they retain the layers of the $\alpha$-$NaCrO_2$ structure over a wide range of values of x. In individual cases, the range of x within which structural stability obtains must be determined experimentally. Further requirements for a solid-solution electrode are good electronic conductivity as well as good ionic conductivity at operating temperatures.

It has already been stated that certain compounds of the formula $A_xM_yO_2$ but where x is approximately equal to 1 are known; they have, however, been prepared by high temperature routes not involving $A^+$ cation extraction. Compounds of the formula $A_xM_yO_2$ where x is substantially less than 1 cannot be made by the known high temperature route because of their instability at elevated temperatures. Thus, the method according to the second aspect of the invention may be invoked and which may be carried out at sufficiently low temperatures to avoid instability problems.

Certain compounds of the formula $A_xM_yO_2$ as defined in the first aspect of this invention, where x is substantially less than 1, are new in themselves. Thus, the invention provides, in a third aspect, an ion conductor, characterised by the formula $A_xM_yO_2$ and having the layers of the $\alpha$-$NaCrO_2$ structure, in which formula x is 0.8 or less and y, A and M are defined as above. Particularly preferred compounds are those where A is Li and M is Co or Ni and to which specific reference will be made in the examples of this specification. In practice, x has not been reduced to zero, but, as stated above, values down to 0.067 have been attained.

In a fourth aspect, the invention provides an electrochemical cell comprising a liquid or solid electrolyte arranged between solid-solution electrodes, characterised in that at least one of the solid-solution electrodes is constituted by an ion conductor of the formula $A_{x'}M_yO_2$ as defined in the second aspect of the invention. Preferably $x'$ is less than 1, and may for example be in the range 0.2 to 0.8. As an example of such a cell, an ion conductor of the formula $A_{x'}M_yO_2$ may be used with a solid-solution counter electrode in place of an alkali metal as in the cell represented as $Li_aTiS_2$/electrolyte/$A_{x'}M_yO_2$ wherein a is less than or equal to 1 and the ion conductor of the formula $A_{x'}M_yO_2$ constitutes the cathode.

Figure 2:
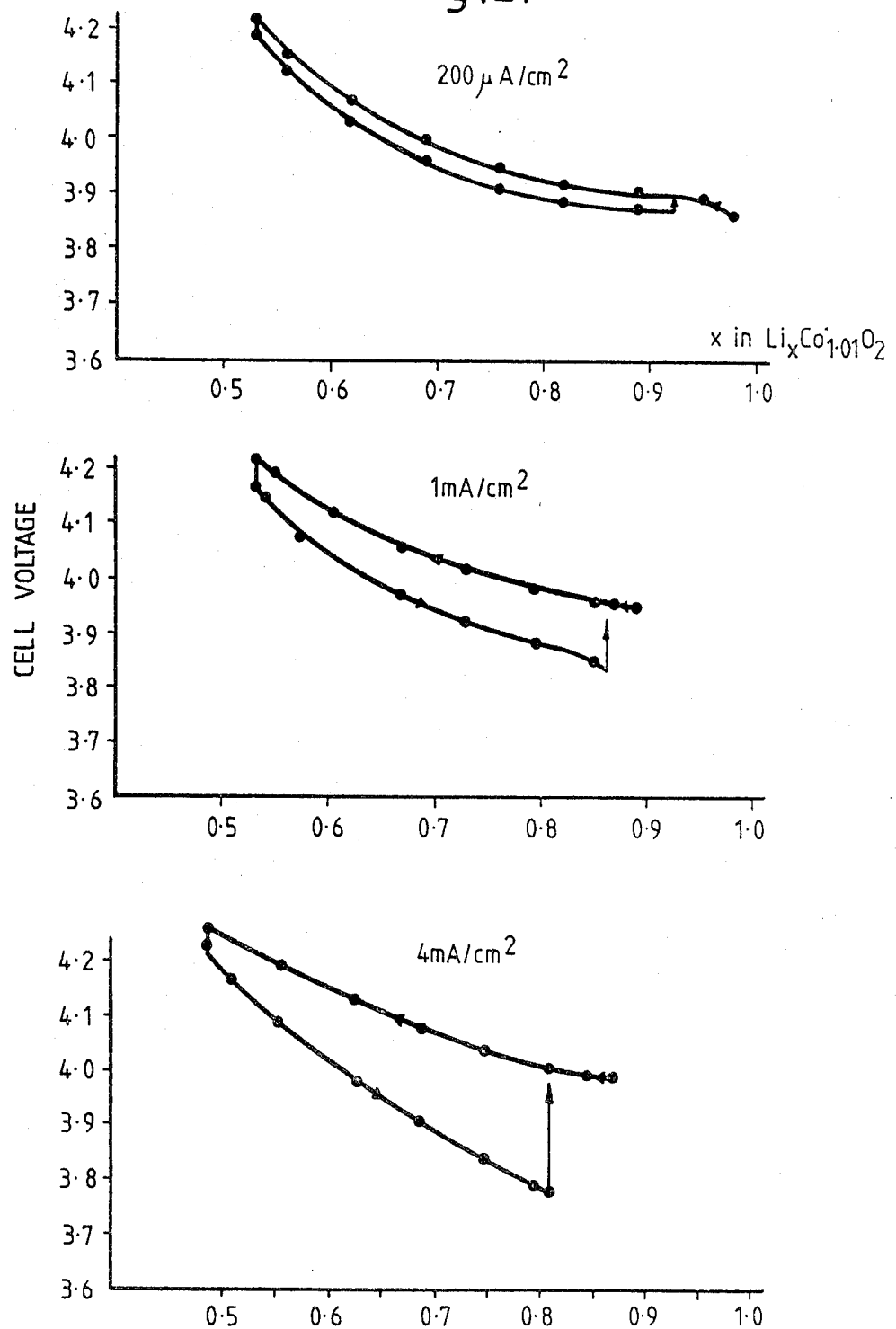

The invention will now be particularly described by way of example only as follows. Reference will also be made to FIGS. 1 and 2, which show open circuit voltages and overvoltage-composition curves for $Li_xCo_yO_2$ and to FIG. 3 which shows open circuit voltages for $Li_xNi_yO_2$.

EXAMPLE 1

Preparation of $Li_xCo_yO_2$

A sample of nominal composition $NiCoO_2$ was prepared by heating a pelletized mixture of lithium carbonate and cobalt carbonate in air at 900° C. for 20 hours followed by two further firings. An X-ray photograph could be indexed on a hexagonal unit cell with $a = 2.816(2)$ Å, $c = 14.08(1)$ Å. No extraneous reflections were observed, and the data agreed well with those of other workers.

Total cobalt was determined by FDTA titration, the cobalt oxidation state by reduction to Co(II) with excess ferrous ammonium sulphate and back titration with standard potassium dichromate. Analysis for oxidizing power gave 47.0% Co(III) by weight with total cobalt as 48.2%. This indicates a very small amount of Co(II) present, and the most satisfactory formulation is $Li_{0.99}Co_{1.01}O_2$ with a small amount of cobalt atoms in the lithium layer.

A non-aqueous electrochemical cell Li/LiBF$_4$(1 M) propylene carbonate $Li_{0.99}Co_{1.01}O_2$ was set up and the open cell voltages shown in FIG. 1 recorded. These were reproduced using $Li_{0.1}V_2O_5$ as reference and counter electrode in order to lower the cell voltage and eliminate the possibility of electrolyte breakdown. The E vs x curve corresponds to a theoretical energy density of 1.11 kWhkg$^{-1}$ for the reaction energy density of 1.11 kWhkg$^{-1}$ for the reaction 0.833 Li + $Li_{0.067}Co_{1.01}O_2$ = $Li_{0.95}Co_{1.01}O_2$. The corresponding value for the reaction Ni + TiS$_2$ = LiTiS$_2$ is 0.48 kWhkg$^{-1}$. Reversibility tests between $Li_{0.99}Co_{1.01}O_2$ and $Li_{0.5}Co_{1.01}O_2$ are shown in FIG. 2 for current densities up to 4 mAcm$^{-2}$. A room temperature chemical diffusion constant $\hat{D}$, was measured as $\approx 5 \times 10^{-9}$ cm$^2$sec$^{-1}$ comparable to a value of $\approx 10^{-8}$ cm$^2$sec$^{-1}$ recorded for $Li_aTiS_2$.

Small samples, corresponding coulometrically to x = 0.74, 0.49 and 0.33 were removed from the cell and examined by X-ray diffraction. All peaks could be indexed on the hexagonal cell of $LiCoO_2$ and the intensity variation was that expected for this structure. Data is given in the table below and show a retention of the layer structure on removal of lithium atoms.

Room temperature hexagonal (R$\bar{3}$m) parameters for the system $Li_xCo_{1.01}O_2$.

| | a/Å | c/Å |
|---|---|---|
| $Li_{0.99}Co_{1.01}O_2$ | 2.816(2) | 14.08(1) |
| $Li_{0.74}Co_{1.01}O_2$ | 2.812(2) | 14.22(1) |
| $Li_{0.49}Co_{1.01}O_2$ | 2.807(2) | 14.42(1) |

EXAMPLE 2

Preparation of $Li_xNi_yO_2$

Figure 3:
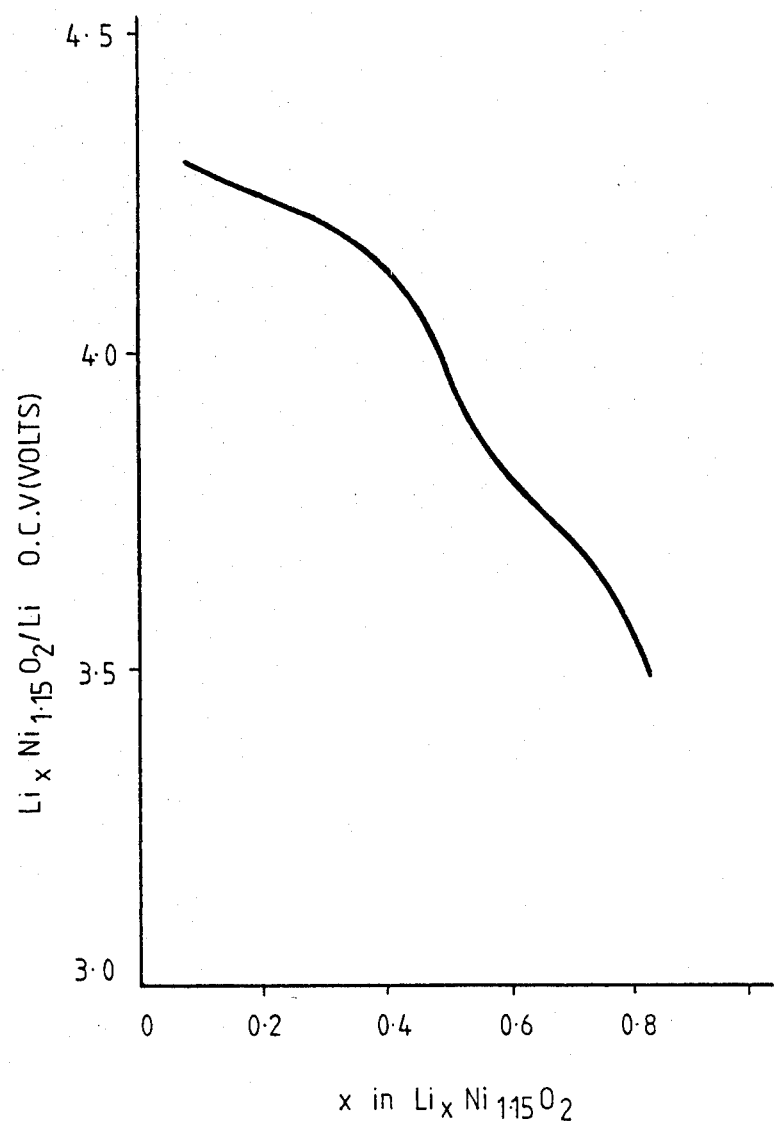

LiOH.H$_2$O and Ni powder were heated under O$_2$ at 750° C. for 12 hours followed by regrinding and further firings. Total nickel was determined with dimethylglyoxime and the nickel oxidation state with iodide. This gave a composition $Li_{0.85}Ni_{1.15}O_2$. X-ray diffraction measurements showed a single phase with lattice parameter $a = 2.892(1) c = 14.21(1)$ which agrees well with published data for this composition. The E vs x curve is shown in FIG. 3 and the voltages are again approximately twice those found for $Li_aTiS_2$. X-ray measurements on phases removed from the electrochemical cell imply a retention of structure. Overvoltages were much higher than the cobalt case but can be reduced by making a more stoichiometric material.

We claim:

1. A method of making an ion conductor of the formula $A_xM_yO_2$ and having the layers of the $\alpha$-NaCrO$_2$ structure, in which formula A is Li, Na or K, wherein M is a transition metal, wherein x is less than 1; and wherein y is approximately equal to 1 which method comprises extracting A+ cations from a compound having the formula $A_{x'}M_yO_2$ wherein A, M, and y are as defined hereinbefore and wherein x' is less than or equal to 1.

2. A method according to claim 1, wherein the A+ cations are extracted electrochemically.

3. A method according to claim 2, wherein the electrochemical extraction is carried out by charging a cell represented as A/electrolyte/$A_{x'}M_yO_2$ towards a cell represented as A/electrolyte/$M_yO_2$.

* * * * *